March 23, 1954  P. D. BECKER  2,672,659
CAPTIVE NUT FASTENER ASSEMBLY
Filed May 5, 1950
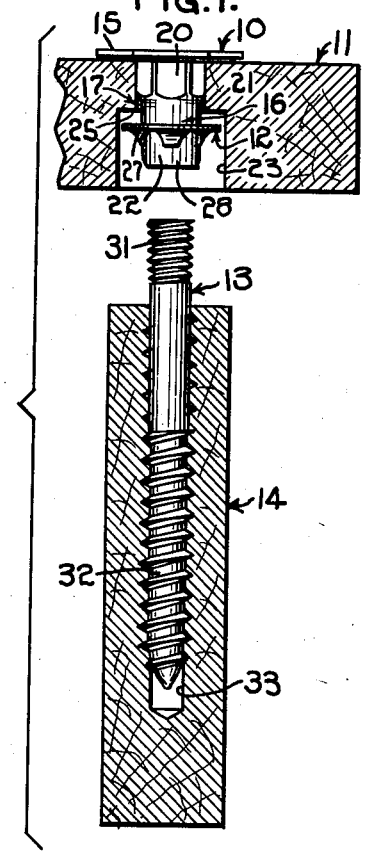
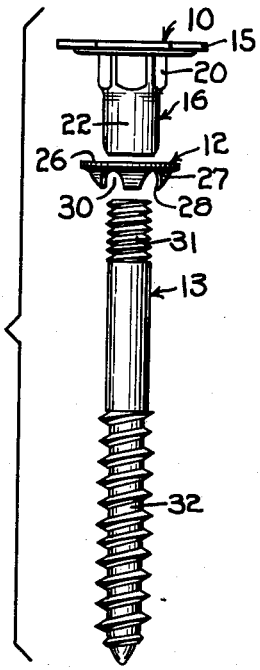
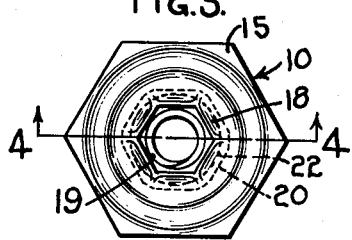
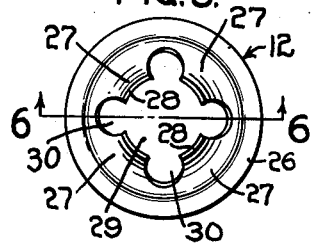
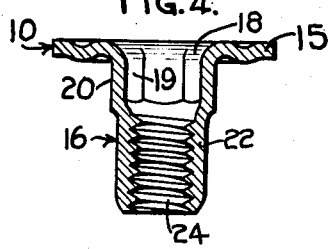
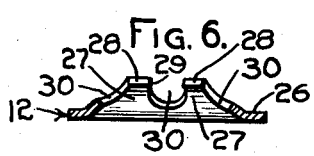
INVENTOR:
PHILIP D. BECKER,
BY Philip E. Parker
ATTORNEY.

Patented Mar. 23, 1954

2,672,659

UNITED STATES PATENT OFFICE 2,672,659

CAPTIVE NUT FASTENER ASSEMBLY

Philip D. Becker, Hingham, Mass., assignor to United-Carr Fastener Corporation, Cambridge, Mass., a corporation of Massachusetts Application May 5, 1950, Serial No. 160,333

1 Claim. (Cl. 20—92)

This invention relates to fasteners, and more particularly to fastener assemblies and retaining means for attaching a fastener to an apertured part or support, and aims generally to improve and simplify existing devices of this general type.

A primary object of the invention is the provision of a fastener which may be rotatably mounted on an apertured part and readily manipulated to engage a threaded member secured to an adjoining part to be secured thereto.

A further and more specific object of the invention is the provision of a flanged nut assembly of simple and economical construction provided with improved means for rotatably mounting said assembly on an apertured part and for retaining said assembly in mounted position.

Another object of the invention is the provision of a novel flanged nut assembly which may be readily assembled on an apertured part and engaged with a cooperating member on an adjoining part to form a strong and secure fastening between the two parts.

These and other objects and advantages of the invention will be apparent to persons skilled in the art to which the invention pertains from a consideration of the accompanying drawings and annexed specification illustrating and describing a preferred construction embodying the invention.

In the drawings:

Fig. 1 is a side view partly in section showing the flanged nut assembly of the invention mounted in an apertured part and positioned to engage a threaded stud anchored in an adjoining part;

Fig. 2 is an exploded side view of the device showing the parts in position prior to assembly in the parts to be connected;

Fig. 3 is a plan view of the nut;

Fig. 4 is a vertical cross-sectional view of the nut taken on the line 4—4 of Fig. 3;

Fig. 5 is a plan view of the ratchet plate; and

Fig. 6 is a vertical cross-sectional view of the ratchet plate taken on line 6—6 of Fig. 5.

Referring to the drawings, the improved device of the invention comprises a fastener member 10 rotatably secured on an apertured part 11 by a retaining plate 12 and adapted for screwthreaded engagement with a stud member 13 anchored in an adjoining part 14. The parts 11 and 14 may be parts of a box, crate, or building or other structure which are to be securely fastened together either permanently, as for storage and the like, or temporarily as for certain uses such as crating and transportation of merchandise.

According to the invention, the fastener member 10 preferably comprises a nut member having a flanged base portion 15 adapted to engage an outer face of the apertured part 11 and a tubular sheet metal barrel or sleeve portion 16 receivable in an aperture 17 of the part 11. The base portion 15 extends outwardly from one end of the barrel or sleeve portion 16, preferably integrally therewith, and may desirably be of square, hexagonal or other irregular shape for cooperation with wrenches, pliers or other tools.

The central aperture 18 of the base portion 15 is preferably irregular in shape such as square, hexagonal or the like and communicates with a similarly shaped elongated opening 19 in the upper part 20 of the barrel or sleeve member 16. The openings 18 and 19 form a socket for the reception of a stud wrench by which the nut may be rotated to engage it with or disengage it from the stud member 13.

The upper part 20 of the member 16 is rotatably received in a reduced portion 21 of the aperture 17. The lower part 22 of the barrel or sleeve member 16 extends into an enlarged portion 23 of the aperture 17 and is threaded interiorly as at 24 for the reception of the threaded stud 13.

The flanged nut 10 is locked in position on the apertured part 11 by the ratchet retaining plate 12 mounted on the lower part 22 of the barrel or sleeve member 16 and adapted to engage a shoulder 25 of the apertured part 11 formed between the upper reduced portion 21 and the lower enlarged portion 23 of the aperture 17.

The ratchet plate 12 comprises a dish-shaped member having a peripheral flanged portion 26 adapted to engage the shoulder 25 and a plurality of inwardly and laterally extending curved spring fingers 27 having sharp terminal edges 28 adapted to frictionally and bitingly engage the lower portion 22 of the barrel or sleeve member 16. Four of such fingers are shown for purposes of exemplification. The plate 12 is assembled with the flanged nut 10 by forcing it inwardly over the end portion 22 thereof against the resistance of the spring fingers 27. When thus assembled the ratchet plate 12 is securely retained in mounted position on the sleeve member 16 by virtue of the frictional engagement of the spring fingers 27 with the lower portion 22 thereof. Furthermore, any force tending to dislodge the plate 12 will force the terminal edges 28 of the spring fingers 27 into tighter frictional and biting engagement with the sleeve member 16 by virtue of the lateral inclination and convex curvature of the spring fingers which disposes the edges 28 in position to increasingly oppose such dislodgment.

The ratchet plate 12 may desirably be formed from a flat piece of sheet metal cut to the desired size, punched or drilled to form a central opening 29 and communicating spaced openings 30, and then pressed laterally inwardly of the flat peripheral flanged portion 26 to form the convexly curved spring fingers 27.

In assembled position on the apertured part 11 the nut 10 is adapted to screw-threadedly engage a threaded stud 13 anchored in an adjoining part 14 and tightened thereon to securely attach the parts together. The stud 13 may be a hanger bolt or the like having a threaded upper portion 31 for engagement with the threaded portion 24 of the nut 10 and a threaded lower portion 32 which may be provided with threads similar to those of a wood screw or the like for engagement with the part 14. Desirably a hole 33, somewhat smaller than the threaded portion 32, may be drilled into the part 14 to facilitate anchoring of the stud 13 therein.

It will thus be seen that the present invention provides a simple and economical device which may be quickly and easily assembled on an apertured part and readily manipulated by a stud wrench or the like for securing parts together to form a strong and durable joint. It is particularly suitable for assembling boxes, crates and the like used for shipping, storage and other purposes and has the advantage over the usual types of securing means for such purposes in that it forms a stronger and more durable joint and may readily be manipulated to disassemble the boxes, containers et cetera when access to the contents thereof is desired.

Although I have illustrated and described a preferred embodiment of the invention, I do not intend to be limited thereto as the scope of the invention is best defined in the appended claim.

I claim:

A captive nut fastener installation comprising: a supporting member having a recess opening on one face and an aperture opening on said recess and the opposite face of said supporting member; a nut member formed from sheet material having a sleeve portion extending through said aperture into said recess, and an outwardly extending flange at one end of said sleeve with a face adjacent said sleeve in engagement with said opposite face of said support, the portion of said sleeve adjacent said flange having an irregular internal shape to permit cooperative engagement with a tool, the opposite end of said sleeve portion being internally threaded, said sleeve being rotatable within said aperture; a retaining member formed from sheet material within said recess having a peripheral ring portion surrounding said sleeve in engagement with the base of said recess and resilient prongs spaced about said sleeve extending inwardly from said ring portion and angularly toward the end of said sleeve portion opposite said flange and providing at their free ends biting edges in engagement with the outer surface of said sleeve portion; a supported member having a hole opening on one face, and a bolt member having threaded portions at each end, one end being engaged in the threaded portion of said sleeve portion and the other end in threaded engagement in the hole of said supported member securing said supported member in fastened engagement with said one face of said supporting member.

PHILIP D. BECKER.

References Cited in the file of this patent

UNITED STATES PATENTS

| Number | Name | Date |
| --- | --- | --- |
| 1,251,676 | McCaffray | Jan. 1, 1918 |
| 1,401,956 | Bonnell | Jan. 3, 1922 |
| 1,498,360 | Douglas | June 17, 1924 |
| 1,679,844 | Volkhausen | Aug. 7, 1928 |
| 1,734,184 | Stoler | Nov. 5, 1929 |
| 1,862,275 | Menut | June 7, 1932 |
| 2,041,613 | Lincks | May 19, 1936 |
| 2,095,397 | Overmyer | Oct. 12, 1937 |
| 2,160,653 | Green | May 30, 1939 |
| 2,244,427 | Miller | June 3, 1941 |
| 2,309,613 | Horton | Jan. 26, 1943 |